United States Patent
Konishi et al.

(10) Patent No.: US 10,836,263 B2
(45) Date of Patent: Nov. 17, 2020

(54) CONTROL APPARATUS AND CONTROL METHOD

(71) Applicant: HONDA MOTOR CO., LTD., Tokyo (JP)

(72) Inventors: Yoshiaki Konishi, Wako (JP); Makoto Kurihara, Wako (JP); Takayuki Kishi, Wako (JP); Toshiyuki Mizuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/225,513

(22) Filed: Dec. 19, 2018

(65) Prior Publication Data

US 2019/0202297 A1 Jul. 4, 2019

(30) Foreign Application Priority Data

Jan. 4, 2018 (JP) .................................. 2018-000184

(51) Int. Cl.
*B60L 7/26* (2006.01)
*B60W 30/18* (2012.01)
(Continued)

(52) U.S. Cl.
CPC ......... *B60L 7/26* (2013.01); *B60W 30/18072* (2013.01); *B60W 30/18127* (2013.01);
(Continued)

(58) Field of Classification Search
CPC ........ B60L 7/26; B60L 2240/423; B60L 7/18; B60L 2250/26; B60L 2260/32; G01S 17/931; G01S 2013/93185; G01S 2013/9316; G01S 13/931; B60W 30/18072; B60W 30/18127; B60W 20/10; B60W 20/12; B60W 30/18; B60W 30/18109; B60W 20/00; B60W 2555/60; B60W 2554/00; B60W 2555/00; B60W 2250/26; B60W 60/00; B60W 10/18; B60W 10/06; B60W 10/08; B60W 40/00; B60W 30/06;
(Continued)

(56) References Cited

FOREIGN PATENT DOCUMENTS

| JP | 2004-159440 A | 6/2004 |
| JP | 2013-099166 A * | 5/2013 |

(Continued)

OTHER PUBLICATIONS

Japanese Office Action issued for Japanese Patent Application No. 2018-000184 dated Nov. 29, 2019.

*Primary Examiner* — Brian P Sweeney
(74) *Attorney, Agent, or Firm* — Thomas Horstemeyer, LLP

(57) ABSTRACT

A control apparatus of a vehicle includes, as a power plant, a motor and a transmission configured to transmit rotation of the motor to an output shaft. The control apparatus comprises: an acquisition unit configured to acquire information of a stop position at which the vehicle stops; a decision unit configured to decide a deceleration start position at which deceleration is started to stop at the stop position; and a control unit configured to switch, when performing deceleration control of the vehicle toward the stop position, deceleration control of the power plant between a manual driving mode and an automated driving mode.

5 Claims, 7 Drawing Sheets

(51) Int. Cl.
  *G01S 17/93* (2020.01)
  *G01S 17/931* (2020.01)
  *G01S 13/931* (2020.01)

(52) U.S. Cl.
  CPC ....... *G01S 17/931* (2020.01); *B60L 2240/423* (2013.01); *G01S 13/931* (2013.01); *G01S 2013/9316* (2020.01); *G01S 2013/93185* (2020.01)

(58) Field of Classification Search
  CPC ...... B60W 30/182; Y02T 10/64; Y02T 10/72; Y02T 10/62
  USPC .......................................................... 701/70
  See application file for complete search history.

(56) References Cited

FOREIGN PATENT DOCUMENTS

| | | |
|---|---|---|
| JP | 2014-058229 A | 4/2014 |
| JP | 2017-191551 A * | 10/2017 |

* cited by examiner

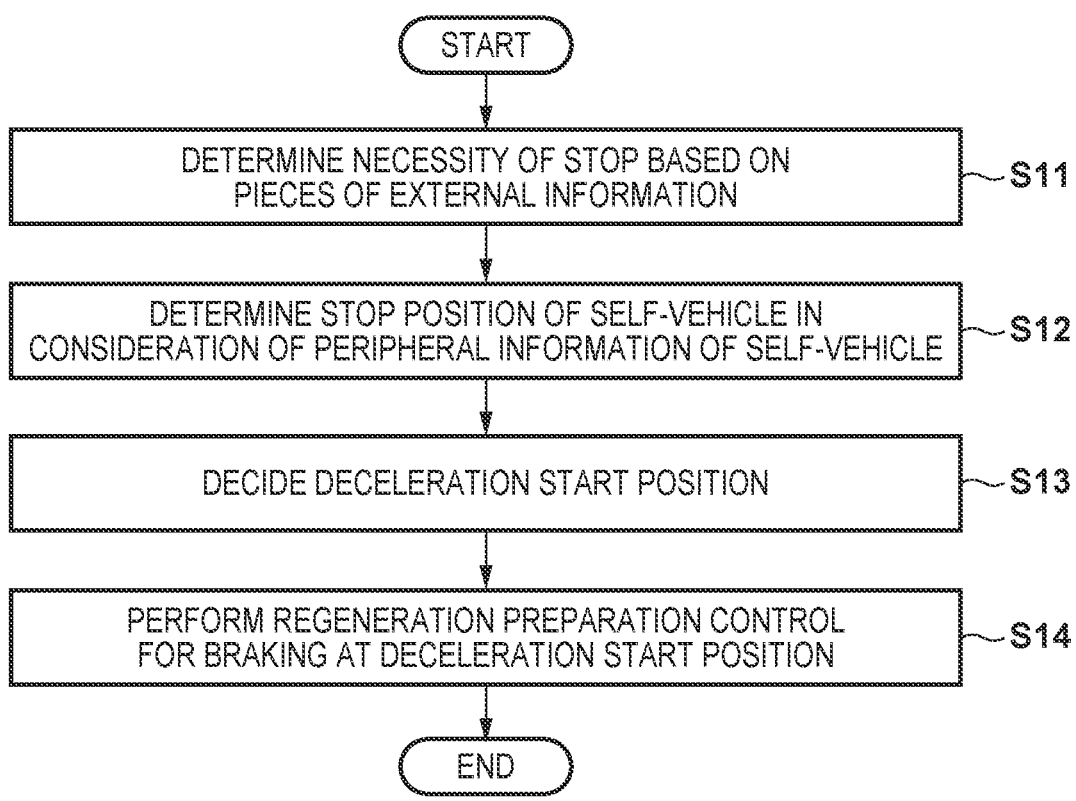

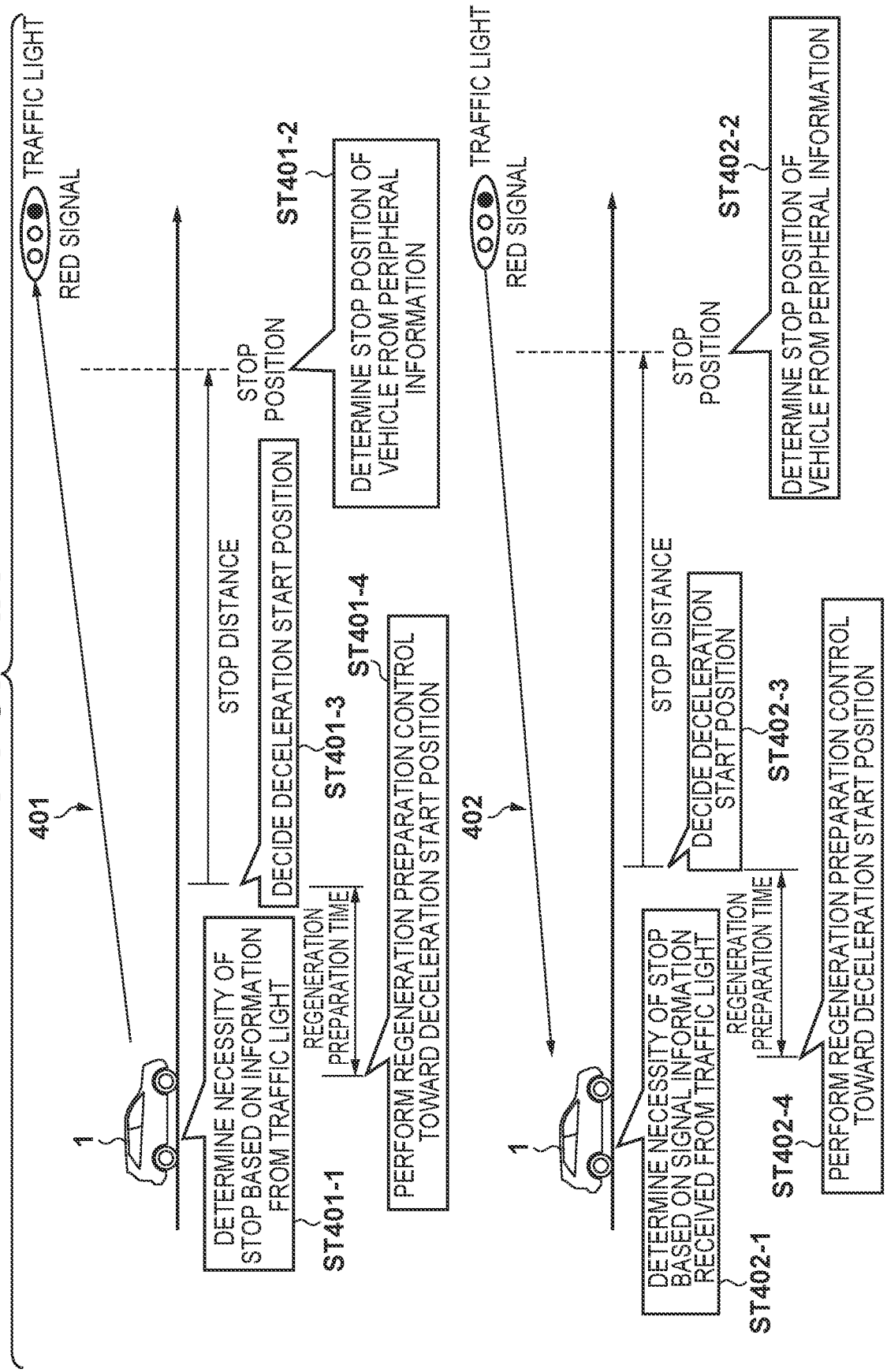

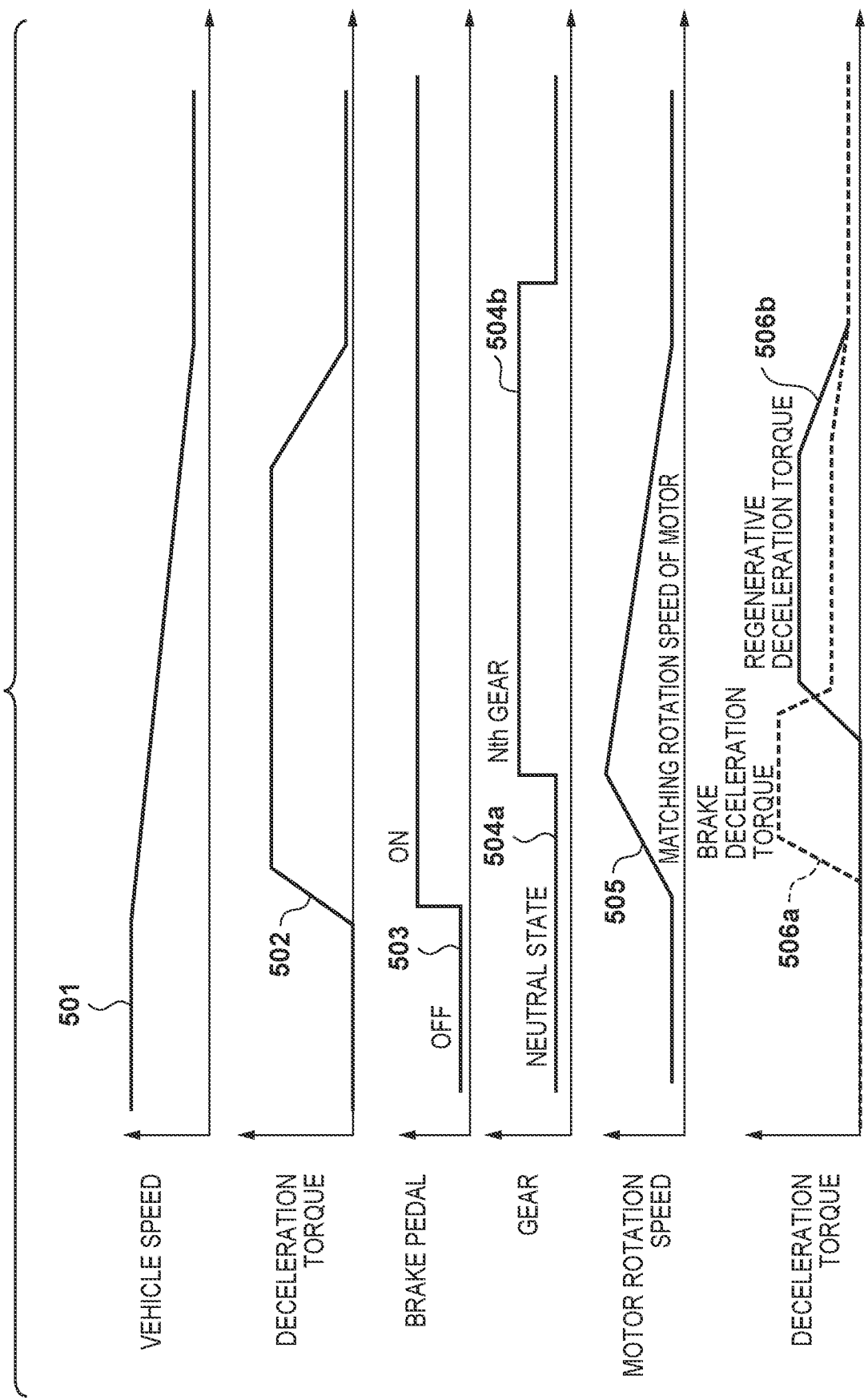

CONTROL APPARATUS AND CONTROL METHOD

CROSS-REFERENCE TO RELATED APPLICATION(S

This application claims priority to and the benefit of Japanese Patent Application No. 2018-000184 filed on Jan. 4, 2018, the entire disclosure of which is incorporated herein by reference.

BACKGROUND OF THE INVENTION

Field of the Invention

The present invention relates to a control apparatus and a control method.

Description of the Related Art

Japanese Patent Laid-Open No. 2004-159440 discloses an arrangement of performing, when a brake pedal is turned on, regenerative control by calculating a driver request braking force and obtaining a regenerative braking force.

However, in the arrangement disclosed in Japanese Patent Laid-Open No. 2004-159440, after the brake pedal is turned on, regenerative control is performed by obtaining a regenerative braking force. Consequently, it is impossible to perform braking using a regenerative deceleration torque at the initial stage of deceleration.

SUMMARY OF THE INVENTION

The present invention provides a control technique of generating, when performing deceleration control in an automated driving mode, a brake deceleration torque and the regenerative deceleration torque of a motor at a position where deceleration is started to stop at a stop position.

According to one aspect of the present invention, there is provided a control apparatus of a vehicle including, as a power plant, a motor and a transmission configured to transmit rotation of the motor to an output shaft, comprising: an acquisition unit configured to acquire information of a stop position at which the vehicle stops; a decision unit configured to decide a deceleration start position at which deceleration is started to stop at the stop position; and a control unit configured to switch, when performing deceleration control of the vehicle toward the stop position, deceleration control of the power plant between a manual driving mode and an automated driving mode, wherein when performing the deceleration control in the manual driving mode, the control unit generates a brake deceleration torque by a brake device at the deceleration start position, and when performing the deceleration control in the automated driving mode, the control unit generates the brake deceleration torque and a regenerative deceleration torque of the motor at the deceleration start position.

According to the present invention, when performing deceleration control in an automated driving mode, it is possible to generate a brake deceleration torque and the regenerative deceleration torque of a motor at a position where deceleration is started to stop at a stop position. That is, it is possible to perform braking using a regenerative deceleration torque at the initial state of deceleration.

Further features of the present invention will become apparent from the following description of exemplary embodiments (with reference to the attached drawings).

BRIEF DESCRIPTION OF THE DRAWINGS

FIG. 3 is a flowchart for explaining the procedure of deceleration control processing of a control unit in an automated driving mode;

FIG. 4A is a view for schematically explaining the procedure of the deceleration control processing of the control unit;

FIG. 5 is a timing chart for explaining output timings of a brake deceleration torque and a regenerative deceleration torque when performing deceleration in a manual driving mode.

DESCRIPTION OF THE EMBODIMENTS

An embodiment of the present invention will be described below with reference to the accompanying drawings. The constituent elements described in the embodiment are merely examples. The present invention is not limited by the following embodiment.

(Arrangement of Vehicle Control Apparatus)

Figure 1:
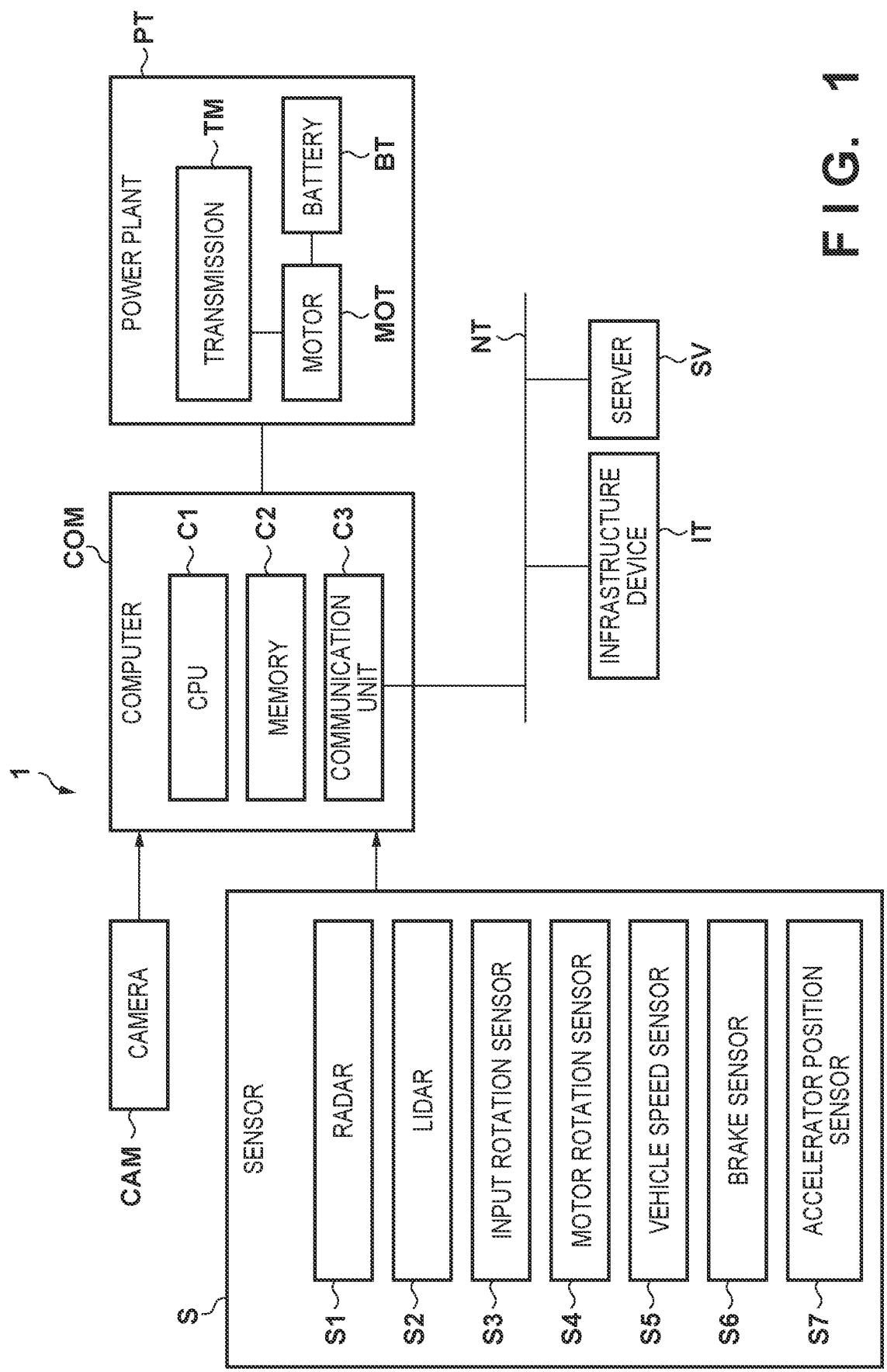
FIG. 1 is a block diagram exemplifying the basic arrangement of a vehicle.

A vehicle according to this embodiment is a vehicle that can travel by automated driving, and FIG. 1 is a block diagram exemplifying the basic arrangement of a vehicle 1. The vehicle 1 includes a sensor S, a camera CAM, and a computer COM (ECU). The sensor S includes, for example, a radar S1, a LIDAR S2, an input rotation sensor S3, a motor rotation sensor S4, a vehicle speed sensor S5, a brake sensor S6, and an accelerator position sensor S7. The sensor S (radar S1 and LIDAR S2) and the camera CAM acquire information of the vehicle 1 (self-vehicle) and a preceding vehicle, and information of a traffic light ahead, and input them to the computer COM.

The computer COM includes a CPU C1 for controlling processing related to automated driving control of the vehicle 1, a memory C2, and a communication unit C3. Based on the information of the preceding vehicle input from the sensor S (radar S1 and LIDAR S2) and the camera CAM, the CPU C1 of the computer COM can determine the stop position of the self-vehicle which stops following the preceding vehicle. The CPU C1 of the computer COM can determine the stop position of the self-vehicle which stops before the traffic light when the information of the traffic light input from the sensor S (radar S1 and LIDAR S2) and the camera CAM indicates that the traffic light is red.

The communication unit C3 is connected to a network NT, and configured to be communicable with a server SV on the network for providing road traffic information, an infrastructure device IT having a communication function, and another vehicle having a communication function. The communication unit C3 can acquire, for example, signal information provided from an optical beacon, and the CPU C1 can determine, based on the signal information acquired by the communication unit C3, whether the traffic light ahead is red. If it is determined, based on the signal information acquired by the communication unit C3, that the traffic light is red, or by obtaining a timing at which the traffic light turns red, the CPU C1 of the computer COM can determine the stop position of the self-vehicle which stops before the traffic light.

The communication unit C3 can acquire map information from the outside, and the CPU C1 can determine, based on the map information acquired by the communication unit C3, whether the self-vehicle temporarily stops ahead on a traveling road. The communication unit C3 can acquire traffic congestion information provided from a road traffic information communication system, and the CPU C1 can determine, based on the traffic congestion information acquired by the communication unit C3, whether the road where the self-vehicle travels is congested ahead.

The communication unit C3 can perform inter-vehicle communication, and transmit information of the stop position of the vehicle 1 (self-vehicle) to a following vehicle of the vehicle 1 (self-vehicle). Furthermore, the communication unit C3 can acquire, by inter-vehicle communication, information of a stop position at which the preceding vehicle stops, and acquire information of the stop position of the vehicle 1 (self-vehicle) based on the acquired information of the stop position of the preceding vehicle.

In this embodiment, the communication unit C3 functions as an acquisition unit that acquires information of a vehicle position at which the self-vehicle stops. The CPU C1 of the computer COM functions as a control unit that performs, based on the information acquired by the communication unit C3, deceleration control of the self-vehicle toward the stop position.

The computer COM can perform image processing for the pieces of information input from the sensor S (radar S1 and LIDAR S2) and the camera CAM, and extract a target (object) existing around the self-vehicle. The computer COM extracts the target from an image acquired by the sensor S (radar S1 and LIDAR S2) and the camera CAM, and analyzes the relative positional relationship between the self-vehicle and the peripheral target to determine the type of the target arranged around the self-vehicle. For example, the computer COM can extract, as a target, a preceding vehicle traveling in front of the self-vehicle, and acquire the inter-vehicle distance (actual inter-vehicle distance) between the self-vehicle and the preceding vehicle, the stop state of the preceding vehicle, and the like.

The input rotation sensor S3 is a sensor that detects the rotation speed of the input shaft that is input from a motor MOT to a transmission TM. The motor rotation sensor S4 is a sensor that detects the rotation speed of the rotating shaft of the motor MOT. The vehicle speed sensor S5 is a sensor that detects the vehicle speed of the vehicle 1. The detection results of the input rotation sensor S3, the motor rotation sensor S4, and the vehicle speed sensor S5 are input to the computer COM.

The brake sensor S6 detects the presence/absence of a depression amount and depression operation of the brake pedal by a driver, and inputs the detected information to the computer COM. The accelerator position sensor S7 detects a depression amount (accelerator position) of the accelerator pedal by the driver, and inputs the detected information to the computer COM.

The computer COM controls a power plant PT for driving the vehicle 1. The power plant PT is a mechanism that outputs a driving force to rotate the driving wheels of the vehicle 1, and includes, for example, the motor MOT and the transmission TM. The power plant PT may also include an engine.

The motor MOT is a motor generator having a function as an electric motor and a function as an electric generator. The motor MOT is electrically connected to a battery BT, and controlled by the computer COM. The rotating shaft of the motor MOT is mechanically connected to the driving wheels of the vehicle 1 via a predetermined gear range of the transmission TM.

If the motor MOT functions as the electric motor, it drives the driving wheels by consuming power of the battery BT. On the other hand, if the motor MOT functions as an electric generator, it performs regenerative power generation using the rotation of the driving wheels to make a regenerative deceleration torque work on the driving wheels while charging the battery BT.

The vehicle 1 controls the power plant PT using the pieces of information of the sensor S and the camera CAM, the information acquired using communication by the communication unit C3, and the information calculated by the CPU C1, and can travel in a manual driving mode based on the operation of the driver or an automated driving mode by the automated driving function of the vehicle 1. The CPU C1 decides a deceleration start position at which deceleration is started to stop at the stop position, and switches deceleration control of the power plant PT between the manual driving mode and the automated driving mode when performing deceleration control of the vehicle toward the stop position.

If the computer COM shown in FIG. 1 is mounted on the vehicle 1, the computer COM may be arranged in an ECU of an image processing system or an ECU of a recognition processing system, that processes the pieces of information of the sensor S and the camera CAM, an ECU that controls the communication unit or an input/output device, an ECU in the control unit that controls driving of the vehicle, and an ECU that controls a brake device, or an ECU for automated driving.

Figure 2:
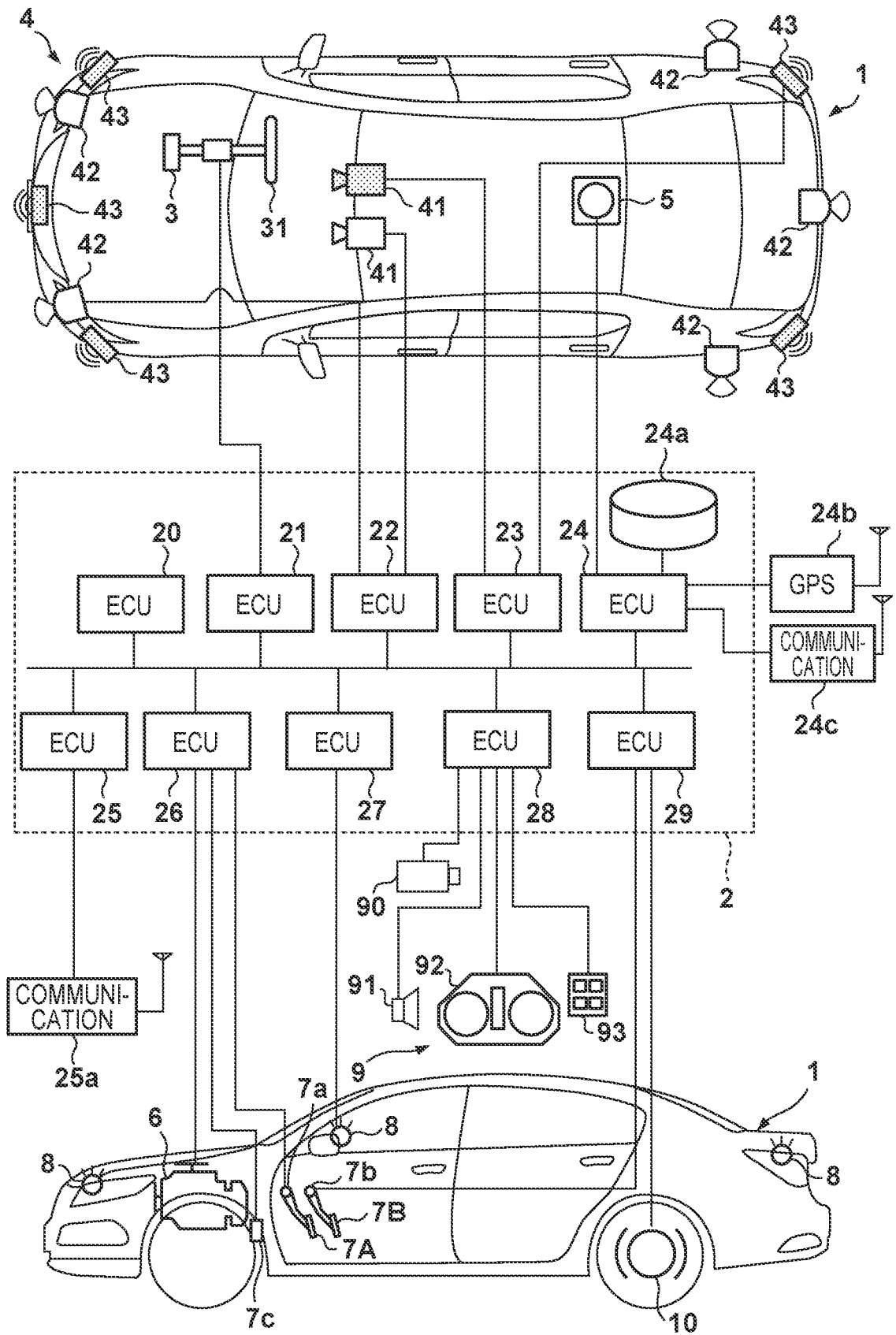
FIG. 2 is a view showing an example of the arrangement of control blocks for controlling the vehicle.

FIG. 2 is a view showing an example of the arrangement of control blocks for controlling the vehicle 1 (self-vehicle). Referring to FIG. 2, an outline of the vehicle 1 is shown in a plan view and a side view. As an example, the vehicle 1 is a sedan-type four-wheeled vehicle. For example, as shown in FIG. 2 to be described below, functions may be distributed to a plurality of ECUs constituting a vehicle control apparatus 100, such as an ECU for the sensor S, an ECU for the camera, and an ECU for automated driving.

A control unit 2 shown in FIG. 2 controls each unit of the vehicle 1. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, and an interface with an external device. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed for the vehicle 1, and they can be subdivided or integrated as compared to this embodiment.

The ECU 20 executes vehicle control associated with automated driving of the vehicle 1 (self-vehicle) according to this embodiment. In automated driving, at least one of steering and acceleration/deceleration of the vehicle 1 is automatically controlled. Processing for practical control associated with automated driving will be described in detail later.

In control of traveling of the vehicle, the ECU 20 controls automated driving traveling of the vehicle by setting an automated driving level based on the position of the vehicle 1 (self-vehicle) indicating the peripheral status of the vehicle, the relative position of another vehicle existing around the vehicle 1, map information or information of a road on which the vehicle 1 travels, and the like.

The automated driving level is operation control information classified into one of a plurality of stages in accordance with the control degree of the control unit (for example, the ECU 20) for an operation associated with acceleration, steering, and braking of the vehicle and the degree of participation of the driver, who operates the vehicle, in a vehicle operation.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the traveling direction of the vehicle 1.

The ECUs 22 and 23 perform control of detection units 41 to 43 that detect the peripheral status of the vehicle and information processing of detection results. The detection unit 41 is, for example, a camera (to be sometimes referred to as the camera 41 hereinafter) that captures the front side of the vehicle 1. In this embodiment, two cameras 41 are provided on the roof front of the vehicle 1. When images captured by the cameras 41 are analyzed (image processing), the contour of a target or a division line (a white line or the like) of a lane on a road can be extracted.

The detection unit 42 (a LIDAR detection unit) is, for example, a LIDAR (laser radar) (to be sometimes referred to as the LIDAR 42 hereinafter), and detects a target around the vehicle 1 or measures the distance to a target using light. In this embodiment, a plurality of LIDARs 42 are provided around the vehicle. In the example shown in FIG. 2, five LIDARs 42 are provided; one at each corner of the front portion of the vehicle 1, one at the center of the rear portion, and one on each side of the rear portion. The detection unit 43 (radar detection unit) is, for example, a millimeter wave radar (to be sometimes referred to as the radar 43 hereinafter), and detects a target around the vehicle 1 or measures the distance to a target using a radio wave. In this embodiment, a plurality of radars 43 are provided around the vehicle. In the example shown in FIG. 2, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral status of the vehicle are provided, the reliability of detection results can be improved. In addition, since detection units of different types such as cameras, LIDARs, and radars are provided, the peripheral environment of the vehicle can be analyzed multilaterally. Note that the ECUs 22 and 23 may be integrated into one ECU.

The ECU 24 performs control of a gyro sensor 5, a GPS sensor 24b, and a communication unit 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication unit 24c performs wireless communication with a server that provides map information or traffic information and acquires these pieces of information. The ECU 24 can access a map information database 24a formed in the storage device. The ECU 24 searches for a route from the current position to the destination. The database 24a can be arranged on the network, and the communication unit 24c can acquire the information by accessing the database 24a on the network.

The ECU 25 includes a communication unit 25a for inter-vehicle communication. The communication unit 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, a motor MOT and a transmission TM. The power plant 6 may further include an engine. The ECU 26, for example, controls the output of the engine in correspondence with a driving operation (accelerator operation or acceleration operation) of the driver detected by an operation detection sensor 7a provided on an accelerator pedal 7A, or switches the gear range of the transmission TM based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 2, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged on, for example, the surface of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation and used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation)

of the driver detected by an operation detection sensor 7b provided on a brake pedal 7B.

If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission TM of the power plant 6 includes a parking lock mechanism, it can be operated to maintain the stop state of the vehicle 1.

The ECU 26 that automatically controls the power plant 6 and the ECU 29 that controls deceleration and stop of the vehicle 1 by automatically controlling the brake device 10 function as a control unit (to be referred to as the "control unit (26 and 29)" hereinafter) that control deceleration of the vehicle 1 (self-vehicle) toward the stop position at which the vehicle 1 (self-vehicle) stops. The control unit (26 and 29) corresponds to the arrangement of the CPU C1 of the computer COM described with reference to FIG. 1.

FIG. 3 is a flowchart for explaining the procedure of deceleration control processing of the control unit (26 and 29) in the automated driving mode. In step S11, the control unit (26 and 29) determines the necessity of stop based on pieces of external information acquired by the cameras 41, sensors (LIDARs 42 and radars 43), and communication units (24c and 25a).

The pieces of external information include, for example, stop information of the preceding vehicle and information of the red traffic light ahead, which are acquired by the cameras 41 and sensors (LIDARs 42 and radars 43), information (for example, information indicating that there is a stop sign ahead) based on map information, information of congestion ahead based on road traffic information, and stop information of the preceding vehicle obtained by inter-vehicle communication with the preceding vehicle, which are acquired by the communication units (24c and 25a).

In step S12, the control unit (26 and 29) determines the stop position of the vehicle 1 (self-vehicle) in consideration of the peripheral information of the vehicle 1 (self-vehicle) acquired by the cameras 41 and the sensors (LIDARs 42 and radars 43).

In step S13, the control unit (26 and 29) decides a position (deceleration start position) at which deceleration is started to stop at the stop position. The deceleration start position is a position at which a brake deceleration torque works on the output shaft by the operation of the brake device 10 together with a regenerative deceleration torque by the motor MOT.

In step S14, the control unit (26 and 29) performs regeneration preparation control for braking at the deceleration start position. When performing deceleration control in the automated driving mode, the control unit (26 and 29) executes, at a timing earlier than the timing of executing deceleration control in the manual driving mode, activation of the rotating shaft of the motor, synchronization control for matching the rotation speed of the rotating shaft of the motor with that of the rotating shaft in a predetermined gear range of the transmission, and engagement control for engaging, with each other, the rotating shaft of the motor and that of the transmission that have been undergone synchronization control.

In the automated driving mode, so as to cause the regenerative deceleration torque to work on the driving wheels via the output shaft together with the brake deceleration torque at the deceleration start position, the control unit (26 and 29) controls to execute, as regeneration preparation control, earlier than deceleration control in the manual driving mode by a regeneration preparation time, activation of the rotating shaft of the motor MOT, synchronization control for matching the rotation speed of the rotating shaft of the motor with that of the rotating shaft (Nth gear) of the transmission TM, and engagement control for setting, in an engaged state (in-gear state), the rotating shaft of the motor MOT and that of the transmission TM which rotates in the Nth gear.

The regeneration preparation time is a time taken to perform regeneration preparation control (motor activation, synchronization control, and engagement control).

The regeneration preparation control can set the rotating shaft of the motor MOT and that of the transmission TM which rotates in the Nth gear in an engaged state (in-gear state) at the deceleration start position where the vehicle 1 starts to decelerate, thereby generating a regenerative deceleration torque at the initial stage of deceleration.

Figure 4B:
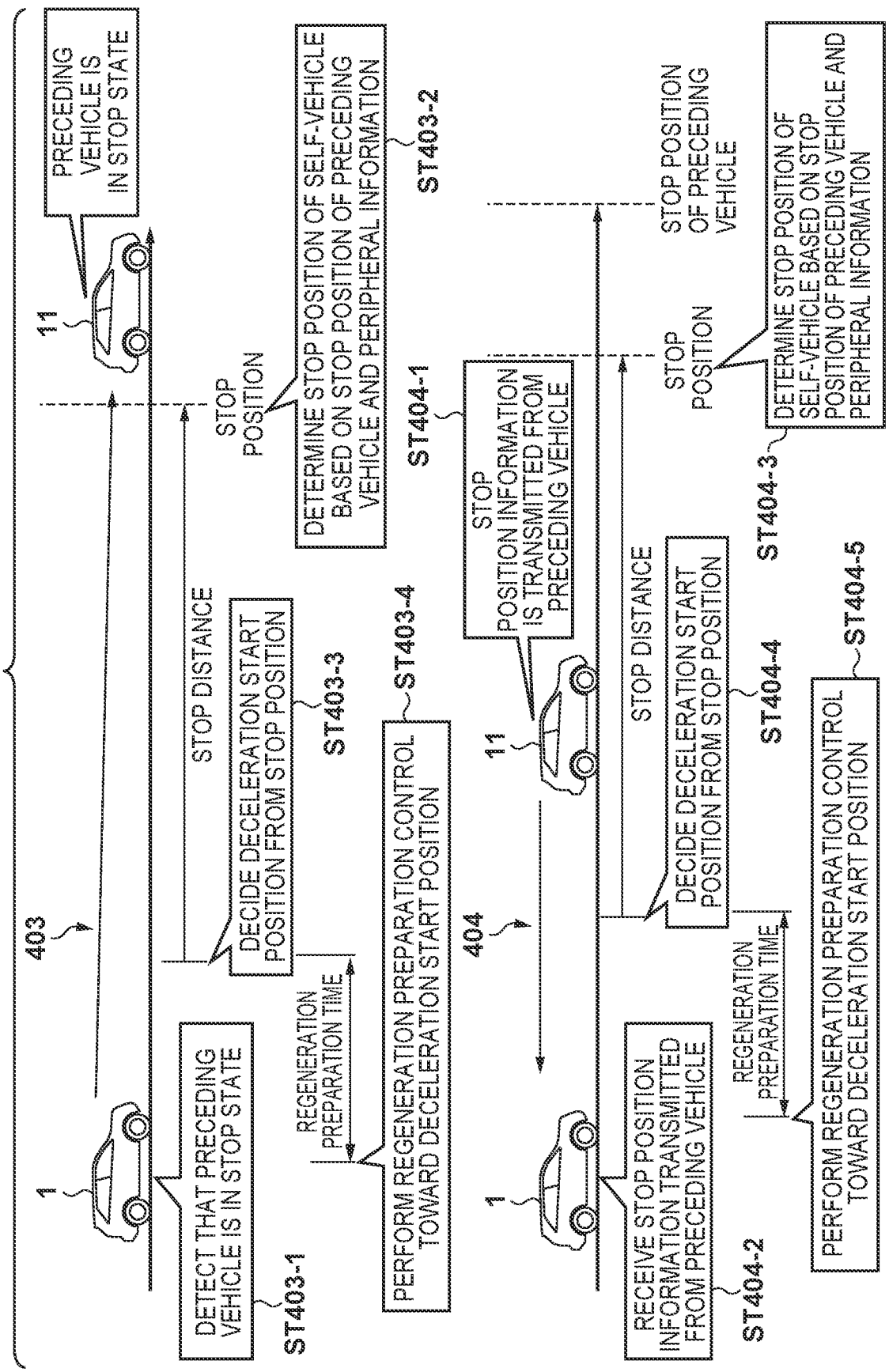
FIG. 4B is a view for schematically explaining the procedure of the deceleration control processing of the control unit.

FIGS. 4A and 4B are views for schematically explaining the procedure of deceleration control processing of the control unit (26 and 29) in the automated driving mode.

In a deciding method example 401 shown in FIG. 4A, if the signal information indicating that the traffic light is red is acquired by the cameras 41 and the sensors (LIDARs 42 and radars 43) of the vehicle 1, the control unit (26 and 29) of the vehicle 1 determines the necessity of stop based on the information from the traffic light (ST401-1). The control unit (26 and 29) determines the stop position of the vehicle 1 (self-vehicle) from the peripheral information (ST401-2), and decides, as a deceleration start position, a position separated from the stop position by a stop distance on the near side (ST401-3).

The control unit (26 and 29) can obtain a stop distance required to stop at the stop position by calculation processing based on information about the traveling speed of the vehicle 1 and a deceleration torque when the brake works. Alternatively, a table for associating the stop distance with the information about the traveling speed and the deceleration torque is saved in the memory C2, and the control unit (26 and 29) can acquire the stop distance based on the traveling speed at the time of traveling with reference to the table in the memory C2.

After the deceleration start position is decided, the control unit (26 and 29) performs regeneration preparation control toward the deceleration start position (ST401-4).

In a deciding method example 402 shown in FIG. 4A, the vehicle 1 determines the necessity of stop based on the signal information received from the traffic light by the communication unit 24c (ST402-1). The control unit (26 and 29) determines the stop position of the vehicle 1 (self-vehicle) based on the peripheral information (ST402-2), and decides, as a deceleration start position, a position separated from the stop position by the stop distance on the near side (ST402-3). After the deceleration start position is decided, the control unit (26 and 29) performs regeneration preparation control toward the deceleration start position (ST402-4).

In a deciding method example 403 shown in FIG. 4B, if the cameras 41 and the sensors (LIDARs 42 and radars 43) of the vehicle 1 detect that a preceding vehicle 11 (another vehicle) is in the stop state (ST403-1), the control unit (26 and 29) of the vehicle 1 determines the necessity of stop based on the stop state information of the preceding vehicle 11 (ST403-1). The control unit (26 and 29) determines the stop position of the vehicle 1 (self-vehicle) based on the stop position of the preceding vehicle 11 and the peripheral information (ST403-2), and decides, as a deceleration start position, a position separated from the stop position by the stop distance on the near side (step ST403-3). After the deceleration start position is decided, the control unit (26 and 29) performs regeneration preparation control toward the deceleration start position (ST403-4).

In a deciding method example 404, when the communication unit 25*a* of the vehicle 1 receives the stop position information transmitted (ST404-1) from the preceding vehicle 11 by inter-vehicle communication, the control unit (26 and 29) of the vehicle 1 determines the necessity of stop based on the received stop position information (ST404-2).

The control unit (26 and 29) determines the stop position of the vehicle 1 (self-vehicle) based on the stop position of the preceding vehicle 11 and the peripheral information (ST404-3), and decides, as a deceleration start position, a position separated from the stop position by the stop distance on the near side (ST404-4). After the deceleration start position is decided, the control unit (26 and 29) performs regeneration preparation control toward the deceleration start position (ST404-5).

FIG. 5 is a view for explaining output timings of a brake deceleration torque and a regenerative deceleration torque when performing deceleration in the manual driving mode.

Referring to FIG. 5, a waveform 501 indicates a change in vehicle speed of the vehicle 1 (self-vehicle), and a waveform 502 indicates a change in deceleration torque. A waveform 503 indicates ON/OFF of the brake pedal 7B (FIG. 2). While the brake pedal 7B is ON, the deceleration torque (waveform 502) rises, and the vehicle speed decreases (waveform 501). While the brake pedal 7B is OFF, the vehicle 1 travels in a coasting state.

In the coasting state, the control unit (26 and 29) controls the transmission TM to set the gear range in a non-engagement state while turning off a clutch into a neutral state, thereby setting a state (coasting state) in which the motor MOT and the driving wheels are separated. While the brake pedal is OFF, the controls unit (26 and 29) controls the rotation speed of the motor MOT to zero.

A waveform 504*a* indicates that the transmission TM is in the neutral state, and a waveform 504*b* indicates a state in which the gear range of the transmission TM is engaged with the Nth gear. The Nth gear of the transmission TM is a gear range in which the rotation of the output shaft connected to the driving wheels is transmitted to the rotating shaft of the motor MOT via the power transmission path of the transmission TM.

The rotation speed of the rotating shaft that rotates in the Nth gear is detected by the input rotation sensor S3, and input to the control unit (26 and 29) (the computer COM shown in FIG. 1).

A waveform 505 indicates a change in rotation speed of the rotating shaft of the motor MOT. The control unit (26 and 29) performs rotation control so that the motor MOT starts rotating at a timing when the brake pedal 7B is turned on. The rotation speed of the rotating shaft of the motor MOT is detected by the motor rotation sensor S4, and input to the control unit (26 and 29) (the computer COM shown in FIG. 1).

The control unit (26 and 29) performs synchronization control of matching the rotation speed of the rotating shaft of the motor MOT with that of the rotating shaft that rotates in the Nth gear. When a difference in rotation speed between the rotating shafts becomes equal to or smaller than a predetermined permitted rotation speed, the control unit (26 and 29) controls the motor MOT and the transmission TM to set a state (in-gear state) in which the rotating shaft of the motor MOT and the rotating shaft of the transmission TM that rotates in the Nth gear are engaged with each other.

A waveform 506*a* indicates an output waveform of a brake deceleration torque, and a waveform 506*b* indicates an output waveform of a regenerative deceleration torque. If the brake pedal 7B is turned on, the brake device 10 outputs a brake deceleration torque. When performing deceleration control in the manual driving mode, the control unit (26 and 29) generates a brake deceleration torque by the brake device at the deceleration start position.

The regenerative deceleration torque (waveform 506*b*) is output when a state (in-gear state) in which the rotating shaft of the motor MOT and that of the transmission TM that rotates in the Nth gear are engaged is set. The motor MOT functions as an electric generator to perform regenerative power generation using the rotation of the driving wheels to generate a regenerative deceleration torque. The generated regenerative deceleration torque works on the driving wheels via the output shaft of the transmission TM. If deceleration control is performed in the manual driving mode, no regenerative deceleration torque (waveform 506*b*) is generated at the deceleration start position, and a regenerative deceleration torque (waveform 506*b*) is generated with a delay with respect to generation of the brake deceleration torque.

Figure 6:
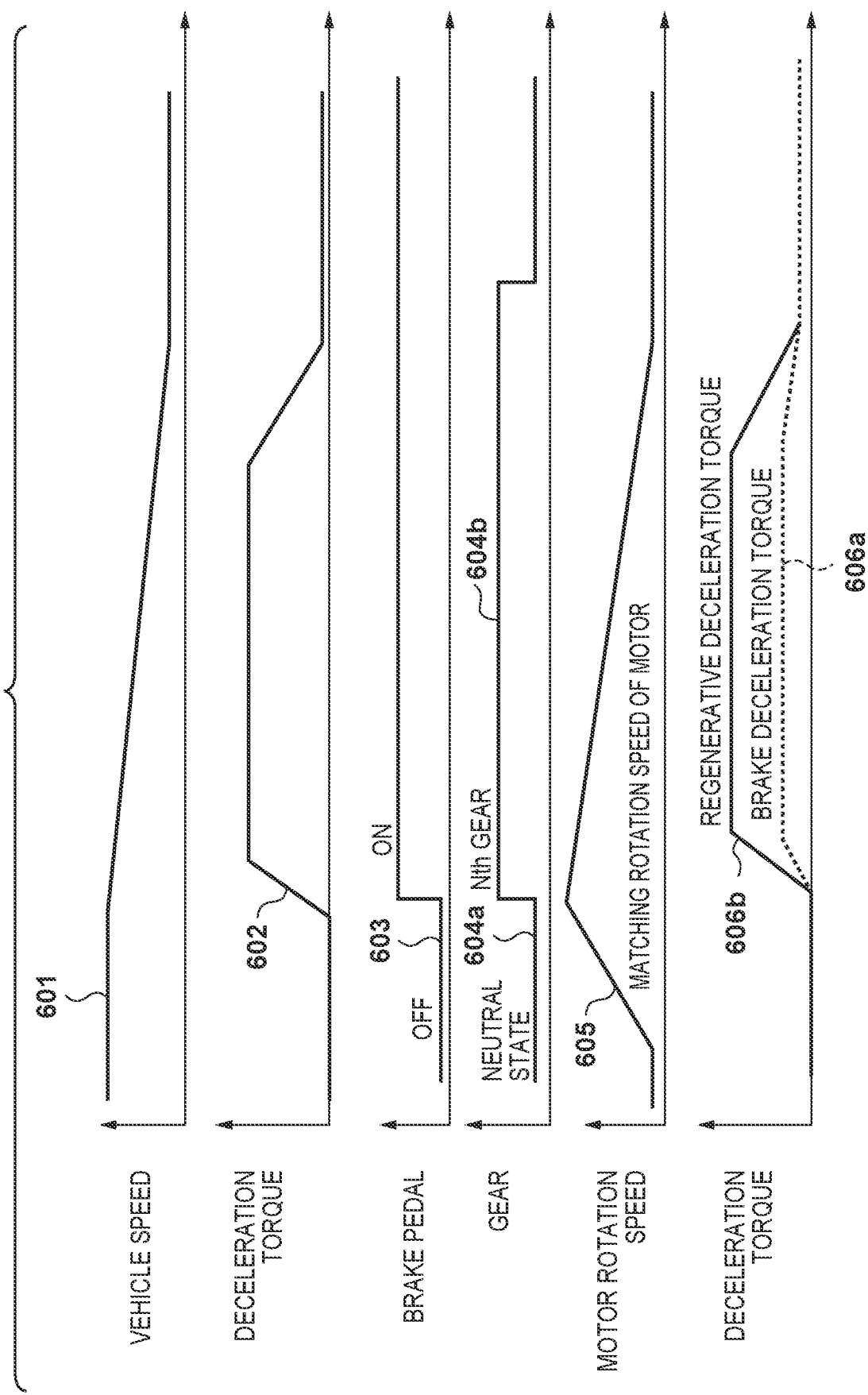
FIG. 6 is a timing chart for explaining output timings of the brake deceleration torque and the regenerative deceleration torque when performing deceleration in the automated driving mode.

FIG. 6 is a view for explaining output timings of the brake deceleration torque and the regenerative deceleration torque when performing deceleration in the automated driving mode.

Referring to FIG. 6, a waveform 601 indicates a change in vehicle speed of the vehicle 1 (self-vehicle), and a waveform 602 indicates a change in deceleration torque. A waveform 603 indicates ON/OFF of the brake pedal 7B. While the brake pedal 7B is ON, the deceleration torque (waveform 602) rises, and the vehicle speed decreases (waveform 601). While the brake pedal 7B is OFF, the vehicle 1 travels in the coasting state.

In the coasting state, the control unit (26 and 29) controls the transmission TM to set the gear range in the non-engagement state while turning off the clutch into the neutral state, thereby setting a state (coasting state) in which the motor MOT and the driving wheels are separated. While the brake pedal 7B is OFF, the controls unit (26 and 29) controls the rotation speed of the motor MOT to zero. By separating the friction elements, deceleration can be suppressed to extend the cruising range.

In the automated driving mode, as regeneration preparation control, control is performed to execute, earlier than deceleration control in the manual driving mode by a regeneration preparation time, activation of the rotating shaft of the motor MOT, synchronization control for matching the rotation speed of the rotating shaft of the motor with that of the rotating shaft (Nth gear) of the transmission TM, and engagement control for setting, in the in-gear state, the rotating shaft of the motor MOT and that of the transmission TM which rotates in the Nth gear. The regeneration preparation time is a time taken to perform regeneration preparation control (motor activation, synchronization control, and engagement control). At the timing when the brake pedal is turned on, that is, at the timing when the vehicle 1 starts to decelerate, the regeneration preparation control can set a state (in-gear state) in which the rotating shaft of the motor MOT and that of the transmission TM which rotates in the Nth gear are engaged with each other.

A waveform 604*a* indicates a state in which the transmission TM is neutral, and a waveform 604*b* indicates a state in which the gear range of the transmission TM is engaged with the Nth gear. The Nth gear of the transmission TM is a gear range in which the rotation of the output shaft connected to the driving wheels is transmitted to the motor MOT via the power transmission path of the transmission TM.

The rotation speed of the rotating shaft that rotates in the Nth gear is detected by the input rotation sensor S3, and input to the control unit (26 and 29) (the computer COM shown in FIG. 1).

A waveform 605 indicates a change in rotation speed of the rotating shaft of the motor MOT, and the control unit (26 and 29) controls the motor MOT and the transmission TM to execute regeneration preparation control earlier than deceleration control in the manual driving mode by a regeneration preparation time.

The rotation speed of the rotating shaft of the motor MOT is detected by the motor rotation sensor S4, and input to the control unit (26 and 29) (the computer COM shown in FIG. 1). The control unit (26 and 29) performs rotation speed matching (synchronization control) between the rotation speed of the rotating shaft of the motor and that of the rotating shaft (Nth gear) of the transmission TM, and sets, at the timing when the brake pedal 7B is turned on, a state (in-gear state) in which the rotating shaft of the motor MOT and that of the transmission TM that rotates in the Nth gear are engaged with each other.

A waveform 606a indicates an output waveform of a brake deceleration torque, and a waveform 606b indicates an output waveform of a regenerative deceleration torque. If the brake pedal 7B is turned on, the brake device 10 outputs a brake deceleration torque, and the motor MOT outputs a regenerative deceleration torque. That is, when performing deceleration control in the automated driving mode, the control unit (26 and 29) generates the brake deceleration torque 606a and the regenerative deceleration torque 606b of the motor at the deceleration start position where the brake pedal 7B is turned on.

By predicting the deceleration start position, and executing regeneration preparation control earlier than deceleration control in the manual driving mode by the regeneration preparation time, it is possible to generate a regenerative deceleration torque at the initial state of deceleration.

Furthermore, a program that implements at least one function described in each embodiment is supplied to a system or an apparatus via a network or a storage medium, and at least one processor in the computer of the system or the apparatus can read out and execute the program. The present invention can be implemented by this form as well.

Summary of Embodiment

Arrangement 1. A control apparatus according to the above embodiment is a control apparatus (for example, COM) of a vehicle (for example, 1) including, as a power plant (for example, PT), a motor (for example, MOT) and a transmission (for example, TM) configured to transmit rotation of the motor to an output shaft, comprising:

an acquisition unit (for example, CAM, S1, S2, 41, 42, 43) configured to acquire information of a stop position at which the vehicle stops;

a decision unit (for example, C1, 26, 29) configured to decide a deceleration start position at which deceleration is started to stop at the stop position; and a control unit (for example, C1, 26, 29) configured to switch, when performing deceleration control of the vehicle toward the stop position, deceleration control of the power plant between a manual driving mode and an automated driving mode, wherein when performing the deceleration control in the manual driving mode, the control unit (C1, 26, 29) generates a brake deceleration torque by a brake device at the deceleration start position (for example, 506a of FIG. 5), and when performing the deceleration control in the automated driving mode, the control unit (C1, 26, 29) generates the brake deceleration torque and a regenerative deceleration torque of the motor at the deceleration start position (for example, 606a, 606b of FIG. 6).

Arrangement 2. There is provided the control apparatus (COM) according to the above embodiment, further comprising a communication unit (for example, C3, 25a) configured to perform inter-vehicle communication, wherein the communication unit transmits the information of the stop position to a following vehicle of the vehicle.

Arrangement 3. There is provided the control apparatus (COM) according to the above embodiment, wherein the communication unit (for example, C3, 25a) acquires, by the inter-vehicle communication, information of a stop position at which a preceding vehicle stops, and the acquisition unit acquires the information of the stop position of the vehicle based on the information of the stop position of the preceding vehicle acquired by the communication unit.

Arrangement 4. There is provided the control apparatus (COM) according to the above embodiment, wherein when performing the deceleration control in the automated driving mode, the control unit (C1, 26, 29) executes, at a timing earlier than a timing of executing the deceleration control in the manual driving mode, activation of a rotating shaft of the motor, synchronization control for matching a rotation speed of the rotating shaft of the motor with a rotation speed of a rotating shaft in a predetermined gear range of the transmission, and engagement control for engaging, with each other, the rotating shaft of the motor and the rotating shaft of the transmission that have been undergone the synchronization control.

Arrangement 5. There is provided the control apparatus (COM) according to the above embodiment, wherein the predetermined gear range (for example, Nth gear) of the transmission is a gear range in which rotation of the output shaft connected to driving wheels is transmitted to the rotating shaft of the motor via a power transmission path of the transmission.

Arrangement 6. A control method according to the above embodiment is a control method for a vehicle including, as a power plant, a motor and a transmission configured to transmit rotation of the motor to an output shaft, comprising:

an acquisition step (for example, step S12 of FIG. 3) of acquiring information of a stop position at which the vehicle stops;

a decision step (for example, step S13 of FIG. 3) of deciding a deceleration start position at which deceleration is started to stop at the stop position; and a control step (for example, step S14 of FIG. 3) of switching, when performing deceleration control of the vehicle toward the stop position, deceleration control of the power plant between a manual driving mode and an automated driving mode, wherein in the control step, when performing the deceleration control in the manual driving mode, a brake deceleration torque by a brake device is generated at the deceleration start position (for example, 506a of FIG. 5), and when performing the deceleration control in the automated driving mode, the brake deceleration torque and a regenerative deceleration torque of the motor are generated at the deceleration start position (for example, 606a, 606b of FIG. 6).

In the control apparatus according to each of arrangements 1 to 5 and the control method according to arrangement 6, when performing the deceleration control in the automated driving mode, it is possible to generate the brake deceleration torque and the regenerative deceleration torque of the motor at the position where deceleration is started to stop at the stop position. That is, it is possible to perform braking using the regenerative deceleration torque at the initial stage of deceleration.

In the control apparatus according to arrangement 2, it is possible to transmit the information of the stop position of the self-vehicle to the following vehicle by the inter-vehicle communication.

In the control apparatus according to arrangement 3, it is possible to acquire, by the inter-vehicle communication, the information of the stop position at which the preceding vehicle stops, and acquire the information of the stop position of the vehicle based on the acquired information of the stop position of the preceding vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus of a vehicle including, as a power plant, a motor and a transmission configured to transmit rotation of the motor to an output shaft, comprising:
    at least one or more processors; and
    at least one memory, storing instructions that, when executed by the at least one or more processors, cause the at least one or more processors to function as:
        an information acquisition unit configured to acquire information of a stop position at which the vehicle stops based on information acquired from at least one of detection units and a communication unit;
        a decision unit configured to decide a deceleration start position at which deceleration is started to stop at the stop position; and
        a control unit configured to switch, when performing deceleration control of the vehicle toward the stop position, deceleration control of the power plant between a manual driving mode and an automated driving mode,
    wherein when performing the deceleration control in the manual driving mode, the control unit generates a brake deceleration torque by a brake device at the deceleration start position,
    wherein when performing the deceleration control in the automated driving mode, the control unit executes, at a timing earlier than a timing of executing the deceleration control in the manual driving mode,
        activation of a rotating shaft of the motor,
        synchronization control for matching a rotation speed of the rotating shaft of the motor with a rotation speed of a rotating shaft in a predetermined gear range of the transmission, and
        engagement control for engaging, with each other, the rotating shaft of the motor and the rotating shaft of the transmission that have been undergone the synchronization control, and
    when performing the deceleration control in the automated driving mode, the control unit generates the brake deceleration torque and a regenerative deceleration torque of the motor at the deceleration start position.

2. The apparatus according to claim 1,
    wherein the communication unit is configured to perform inter-vehicle communication based on wireless communication with another vehicle on a periphery,
    wherein the communication unit transmits the information of the stop position to a following vehicle of the vehicle.

3. The apparatus according to claim 2, wherein the communication unit acquires, by the inter-vehicle communication, information of a stop position at which a preceding vehicle stops, and the information acquisition unit acquires the information of the stop position of the vehicle based on the information of the stop position of the preceding vehicle acquired by the communication unit.

4. The apparatus according to claim 1, wherein the predetermined gear range of the transmission is a gear range in which rotation of the output shaft connected to driving wheels is transmitted to the rotating shaft of the motor via a power transmission path of the transmission.

5. A control method executed by a control apparatus of a vehicle including, as a power plant, a motor and a transmission configured to transmit rotation of the motor to an output shaft, the method comprising:
    acquiring information of a stop position at which the vehicle stops based on information acquired from at least one of detection units and a communication unit;
    deciding a deceleration start position at which deceleration is started to stop at the stop position; and
    switching, when performing deceleration control of the vehicle toward the stop position, deceleration control of the power plant between a manual driving mode and an automated driving mode,
    wherein in the switching,
    when performing the deceleration control in the manual driving mode, a brake deceleration torque by a brake device is generated at the deceleration start position,
        wherein when performing the deceleration control in the automated driving mode, the switching executes, at a timing earlier than a timing of executing the deceleration control in the manual driving mode,
        activation of a rotating shaft of the motor,
        synchronization control for matching a rotation speed of the rotating shaft of the motor with a rotation speed of a rotating shaft in a predetermined gear range of the transmission, and
        engagement control for engaging, with each other, the rotating shaft of the motor and the rotating shaft of the transmission that have been undergone the synchronization control, and
    when performing the deceleration control in the automated driving mode, the brake deceleration torque and a regenerative deceleration torque of the motor are generated at the deceleration start position.

* * * * *